(12) United States Patent
O'Brien et al.

(10) Patent No.: US 6,390,217 B1
(45) Date of Patent: May 21, 2002

(54) VEHICLE FRONT END AIR CONTROL

(75) Inventors: John F. O'Brien, Lockport; Robert Michael Runk, N. Tonawanda; Lindsey Lee Leitzel, Lockport, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/824,295

(22) Filed: Apr. 2, 2001

(51) Int. Cl.$^7$ ................................................ B60K 11/04
(52) U.S. Cl. ............... 180/68.6; 180/68.1; 160/DIG. 1; 160/DIG. 10; 160/DIG. 11
(58) Field of Search ..................... 160/DIG. 1, DIG. 10, 160/DIG. 11; 180/68.1, 68.2, 68.3, 68.4, 68.6

(56) References Cited

U.S. PATENT DOCUMENTS

| | | | | |
|---|---|---|---|---|
| 1,161,444 A | * | 11/1915 | Boughton | 160/DIG. 1 |
| 1,165,461 A | * | 12/1915 | Stein | 160/DIG. 1 |
| 1,248,073 A | * | 11/1917 | Carlson | 160/DIG. 1 |
| 1,261,855 A | * | 4/1918 | Rishel | 160/DIG. 1 |
| 1,268,892 A | * | 6/1918 | Sunnen | 160/DIG. 1 |
| 1,291,807 A | * | 1/1919 | Edmont | 160/DIG. 1 |
| 1,338,223 A | * | 4/1920 | Heath | 160/DIG. 11 |
| 1,379,308 A | * | 5/1921 | Marshall | 160/DIG. 1 |
| 1,404,527 A | * | 1/1922 | Janssen | 160/DIG. 1 |
| 1,771,714 A | * | 7/1930 | Lawrence | 160/DIG. 1 |
| 1,818,328 A | * | 8/1931 | Hess | 160/DIG. 1 |
| 1,823,141 A | * | 9/1931 | Hendrickson | 160/DIG. 1 |
| 2,246,823 A | * | 6/1941 | Vollberg et al. | 160/DIG. 1 |
| 2,254,459 A | * | 9/1941 | Swanda | 160/DIG. 1 |
| 4,750,549 A | * | 6/1988 | Ziegler et al. | 180/65.1 |
| RE34,907 E | * | 4/1995 | Gross | 180/68.6 |

* cited by examiner

*Primary Examiner*—Christopher P. Schwartz
*Assistant Examiner*—Devon Kramer
(74) *Attorney, Agent, or Firm*—Patrick M. Griffin

(57) ABSTRACT

An assembly is provided to increase the efficiency of a vehicle engine cooling and supplementary, heat pump type cabin heating system. A flexible panel located in front of and below the front end heat exchanger can be moved between open and blocking positions. An engine cooling radiator and fan are located behind the front end heat exchanger. In cold weather heating mode, the flexible panel can be rolled to the blocking position, preventing the direct flow of cold outside ram air through the front end heat exchanger. At the same time, the fan is reversed, flowing heated air from the radiator through the front end heat exchanger, improving its efficiency.

4 Claims, 3 Drawing Sheets

VEHICLE FRONT END AIR CONTROL

TECHNICAL FIELD

This invention relates to air conditioning and ventilation systems in general, and specifically to a means for improving the efficiency of front end mounted heat exchangers.

BACKGROUND OF THE INVENTION

Liquid cooled, internal combustion automotive engines are typically mounted at the front of the vehicle, in an engine compartment located behind a grilled front end air opening in the vehicle body. Outside air is naturally forced rearwardly through the front end opening as the vehicle moves forward at speed, generally referred to as ram air. Engine cooling is provided by a radiator mounted behind the grill, which liquid coolant continually pumped through it, and ram air flowing over it. The radiator also requires a cooling fan to blow air over it at low or zero vehicle speeds. Such fans are typically mounted just behind the radiator and run in only one direction, so as to pull air rearwardly through the radiator, as there would generally be no need to provide a reverse air flow.

The ready supply of heated engine coolant being pumped continually through the radiator and engine is conventionally tapped for passenger space heating in cold temperatures. Liquid engine coolant is diverted through what is, in effect, a miniature radiator, known as a heater core. Air forced over the heater core from yet another fan picks up heat for vehicle passenger space heating. As the vehicle first starts out on a cold day, when the engine has not yet warmed up, the forced air flow through the radiator is an impediment to fast heater core warm up. A wide variety of devices have been proposed over the years, from simple covers fastened over the outside of the grill, to moveable vane assemblies, to block the front end air opening temporarily, and speed the warm up process.

Apart from the long felt problem of cold day heater warm up delay, a new challenge in passenger space heating has arisen. As liquid cooled, automotive vehicle engines become smaller and more efficient, they inevitably produce less waste heat. While this eases the need for power train cooling, it is a real problem for the typical, diverted coolant passenger space heating unit. One proposed solution is to use a heat pump system which, theoretically, extracts heat from the outside air, even from cold outside air. Such systems may be used in place of, or as a supplement to, conventional engine coolant diversion systems. Air conditioning or cooling systems mount a condenser in front of and parallel to the radiator, so that outside air, either ram, fan blown, or both, passes through the two heat exchangers in series. Pressurized refrigerant pumped through the condenser, primarily in hot weather, gives up heat to the passing outside air before it reaches the radiator. By making the cooling system reversible (heat pump), the condenser can also be used in reverse in the winter, to pick up heat from the passing outside air before it reaches the radiator. In such case, the condenser is generally referred to as just the "outside" heat exchanger, since it may serve under high pressure (summer) or low pressure (winter) alternately. A long felt problem with a heat pump system used for supplementary heating is that its efficiency is least just when it is most needed, that is, in cold winter weather. Not only does the outside air have less heat energy to give up, but icing of the outside heat exchanger may occur, blocking air flow to the engine cooling radiator behind. A typical de-icing protocol for a heat pump involves running it in summer mode (the reverse of reverse, in effect), which does melt the ice, but which has the decidedly unwelcome side effect of cooling the passenger space.

SUMMARY OF THE INVENTION

The invention provides a novel mechanism for incorporation with the front air opening, radiator, radiator fan and/or outside heat exchanger as defined above, which has the potential to solve all of the problems outlined above, including rapid warm up, lack of cold weather heat pump efficiency, and cold weather outside heat exchanger icing.

In the preferred embodiment disclosed, a flexible film panel is adapted to roll back and forth in a general L shape, with a first, vertical length in front of the condenser/outside heat exchanger, just behind the grill, and a horizontal length running below the heat exchangers and fan. A window in the panel can be selectively located in the horizontal or vertical position, covering or uncovering the front end opening, and thus blocking or un blocking the flow or forced air therethrough. In addition, a means is provided to reverse the radiator cooling fan, most conveniently a reversible electric drive motor.

When a quick warm up is desired, the flexible panel is rolled to the second position, which locates the window in the horizontal position. This leaves the front end covered and substantially blocks the normal, rearward ram air flow through the radiator, and also through the condenser/outside heat exchanger, if one is present. This alone creates a quicker warm up of the engine and conventional liquid engine coolant fed heater core. If desired, the radiator coolant fan can be concurrently run in reverse, establishing a forward moving cooling flow of air through the radiator, unencumbered by the now blocked, normal rearward ram air flow. Such air would be drawn from and through the engine compartment, potentially helping to warm up the radiator even more quickly. This forward, fan air flow would impact the film panel, and then exit the window, which is located below.

In addition, when a condenser/outside heat exchanger is mounted in front of the radiator (but still behind the film panel), ram air flow through it will be blocked, as well. If the fan is also run in reverse, air from the engine compartment will run forwardly through the radiator, pick up heat therefrom, and then flow through the outside heat exchanger. Such air is generally significantly warmer than the blocked outside ram air flow, especially so under the very cold conditions when an accelerated warm up would be required. When the cooling system is being used as a heat pump, its efficiency is thereby enhanced, since it is extracting heat from a warmer air flow. The potential for icing up is also reduced significantly.

Conventional operation is achieved simply by rolling the panel window up to the first position, which leaves the front end air opening un blocked. In addition, the potential exists to only partially block the front end opening, while blocking the area beneath the radiator and condenser with the horizontal length of the flexible panel. This improves operation at idle by allowing the fan to pull enough outside air in to cool the radiator, while the heated air that has flowed rearwardly through the condenser is prevented from recirculating back up and through the front end air stream.

BRIEF DESCRIPTION OF THE DRAWINGS

These and other features of the invention will appear from the following written description, and from the drawings, in which.

DESCRIPTION OF THE PREFERRED EMBODIMENT

Figure 1:
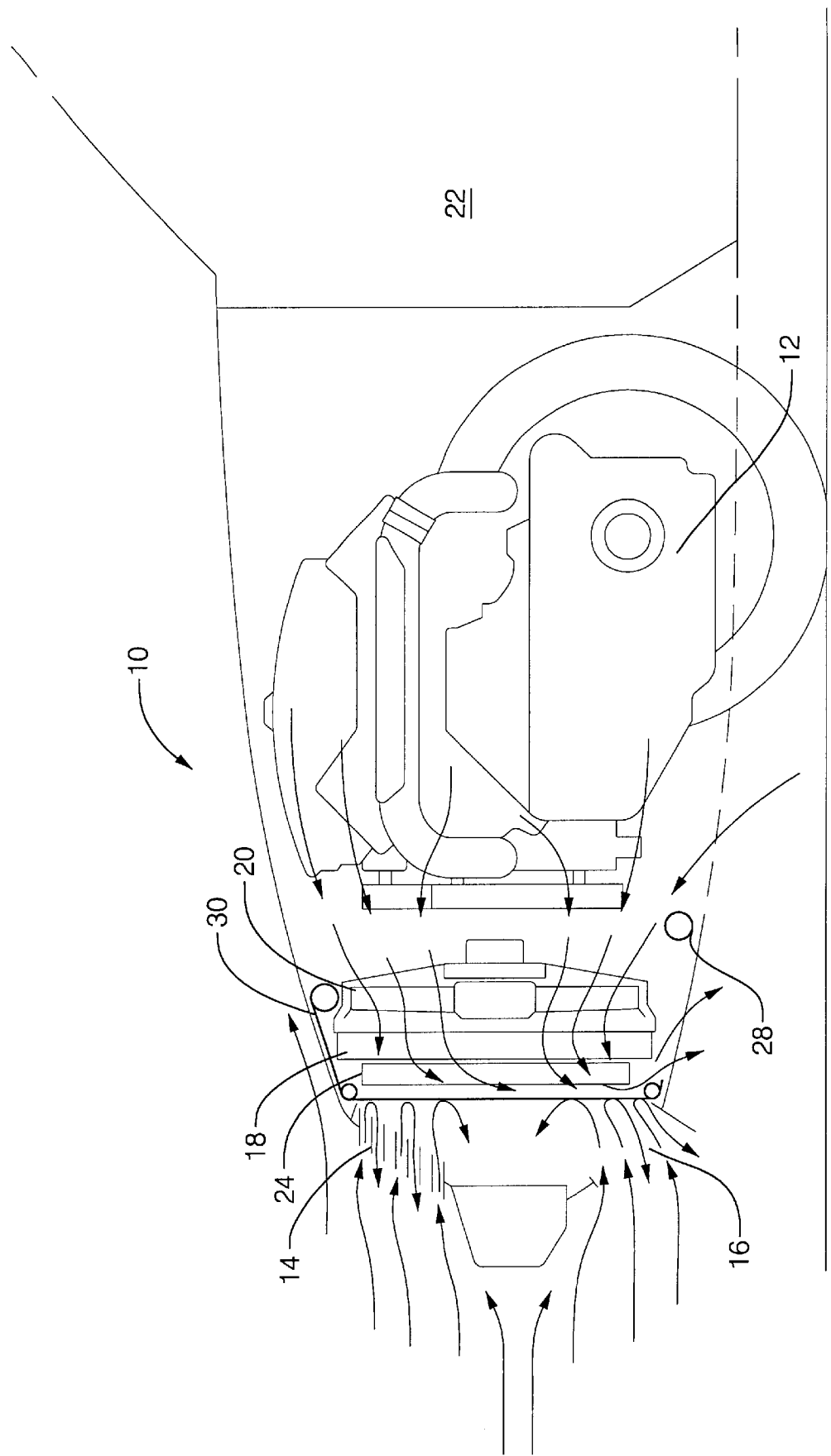
FIG. 1 is a view showing the movable panel in the second position, blocking ram air flow.

Referring first to FIG. 1, a typical vehicle, indicated generally at 10, has an engine 12 located in a compartment near the front of the vehicle 10. At the very front of the vehicle, a grill 14 admits outside air into the engine compartment, and a flow of air also enters through an additional opening 16 below grill 14, which together comprise a general front end air opening. Air will naturally be forced through these openings and around the outside of engine 12 simply due to the forward motion of the vehicle 10, which is referred to as so called ram air. This, of course, will not be sufficient to cool the engine 12 at idle or low speeds, at least for conventional internal combustion engines, which must be liquid cooled. In that regard, engine 12 is formed with internal coolant passages or jackets, not illustrated, through which liquid coolant is pumped and then pumped to and through a radiator 18 mounted behind the grill 14. Proximate to radiator 18 (generally just behind, but occasionally in front) is a cooling fan 20 which assists the natural ram air flow. Fan 20 provides the only, or majority of, the air flow at idle and low vehicle speeds. Increasingly, in newer vehicle designs, cooling fan 20 is operated by an electric motor, rather than being belt driven, which provides better air flow control, especially at low vehicle speeds and low engine RPMs. Normally, both the forward vehicle speed, and the operation of the fan 20, act in concert to move air rearwardly, that is, toward the engine 12. While the fan 20 may be allowed to turn freely or "windmill" at high vehicle speeds, there would normally be no reason to run it in reverse, and every expectation that doing so would be counter productive, since it would retard the desirable flow of ram air.

Still referring to FIG. 1, heating of the vehicle passenger compartment, indicated generally at 22, is typically achieved by diverting some of the heated engine coolant, the same coolant that is circulated through radiator 18, through a heater core, as noted above. The heater core would be enclosed in a box like, conventional HVAC housing, not separately illustrated, which would have its own forced air fan to send tempered air into the passenger compartment 22. Given the almost universal popularity of cooling systems, the HVAC housing will typically contain a conventional evaporator as well, which works in conjunction with a condenser mounted in front of the radiator 18, just behind the grill 14. Conventionally, such an evaporator would receive only expanded, cool refrigerant, and would be used only to cool passenger compartment air, whereas the condenser would receive only heated, pressurized refrigerant, and would be used only to reject heat to the outside air. In the heat pump type of supplementary heating system described above, however, both the evaporator and condenser are dual purpose, and more accurately referred to as simply inside heat exchanger and outside heat exchangers respectively. Such an outside heat exchanger is indicated here at 24. The fan 20 forces air flow over both radiator 18 and outside heat exchanger 24, which would be either extracting heat from, or rejecting heat to, that air flow. As noted above, the clear drawback of the outside heat exchanger 24 is that its coefficient of performance is least just when its need is greatest, when the outside air flowing over it is coldest. It is also subject to icing up in such weather, which disrupts air flow through both it and radiator 18.

Figure 3:
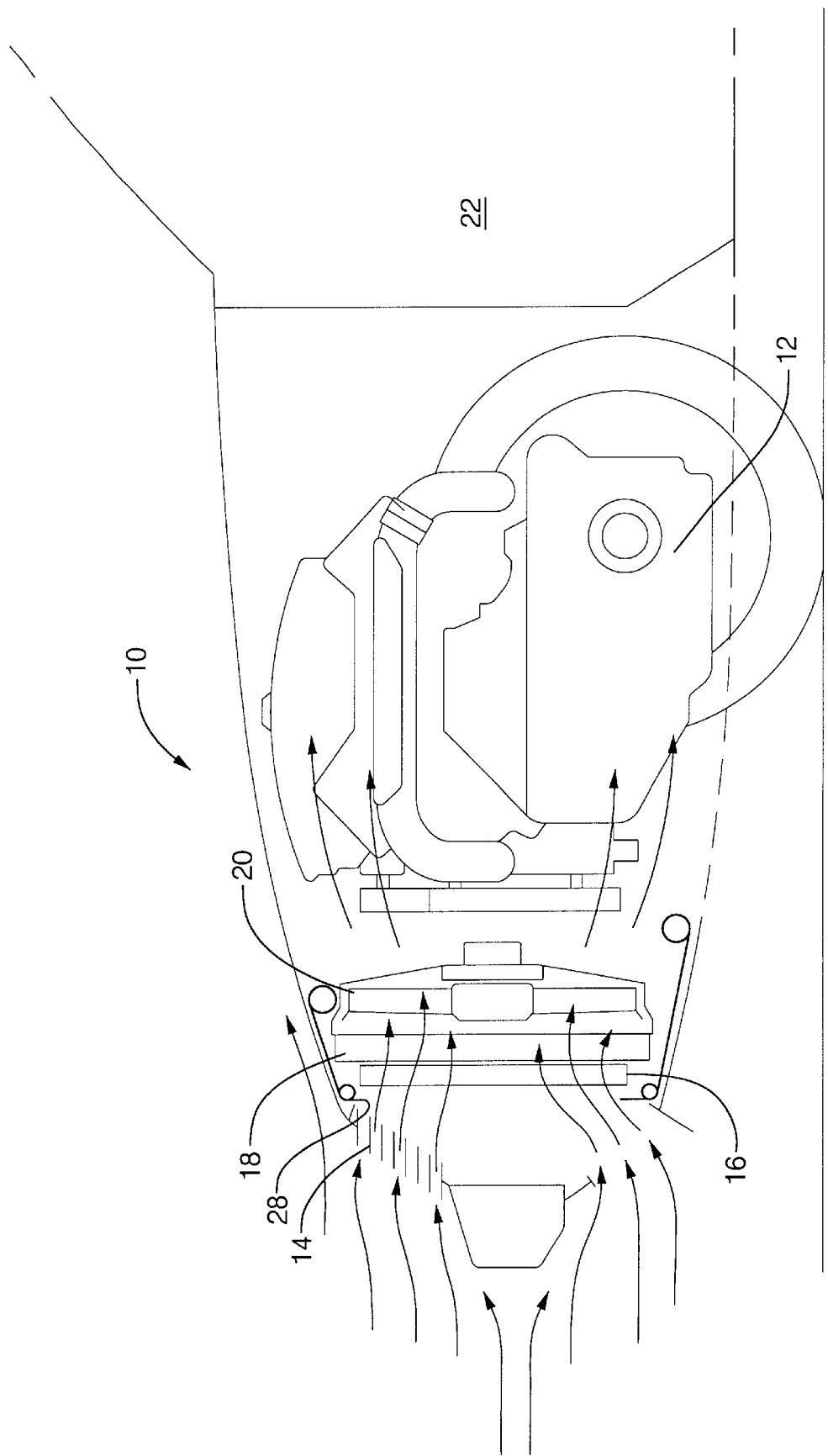
FIG. 3 shows the flexible panel in the first position, allowing a full ram air flow.

Referring to FIGS. 1 and 3, the subject invention deals with the problem of low heat pump coefficient of performance and icing of the outside heat exchanger 24 through the cooperative use of two basic components. One is a selectively reversible motor drive for fan 20. Reversible electric motors are widely available, although there would normally be no perceived use for one in a radiator fan drive, as noted. The other basic component is a large flexible panel indicated generally at 26, mounted in the engine compartment so as to be rolled back and forth between a vertical length running in front of the outside heat exchanger 24, just behind grill 14, and a generally horizontal length running below the outside heat exchanger 24, radiator 18, and fan 20. A window 28, large enough to encompass the whole of grill 14 and the lower opening 16, is formed in panel 26, which is solid but for that. Panel 26 is adapted to be rolled back and forth by suitable roller, spring and motor mechanisms, like those used in now familiar HVAC housing "film valve" designs, but on a larger scale. As such, window 28 can be located in a first or "normal" position, as shown in FIG. 3, where the window 28 is substantially aligned with the grill 14 and adjacent opening 16, leaving both totally unblocked, to a second position, shown in FIG. 1, where outside heat exchanger 24 and radiator 18 are completely blocked from ram air flow. These two capabilities, selective ram air flow blocking, and the potential for reversal of fan 20, are used in conjunction as described below.

Referring again to FIG. 1, with panel 26 rolled to the second, blocking position shown, normal ram air flow through grill 14 and opening 16 is blocked. This alone would cause engine 12 and radiator 18 to "warm up" more quickly in cold weather, acting as the equivalent of grill covers or other known cold ram air blocking devices. Where supplementary heat is also provided from the outside heat exchanger 24, however, an additional boost to cold weather heating is provided. The fan 20 can be reversed, as shown, and air will be pulled from the space around engine 12 and blown forwardly, the reverse of its normal path, through radiator 18 first, then through outside heat exchanger 24, impacting with the solid vertical length of panel 26, and finally exiting through the lower window 28. This forced air flow is aided by extra confinement from an upper substantially horizontal length 30 of the panel 26. It will be recalled that in its "winter" or heating mode, low pressure refrigerant is circulating through the outside heat exchanger 24, ready to extract heat from the air flowing over it. Here, that air is warmer both by virtue of having been drawn from around engine 12, and by virtue of having passed through radiator 18 first. Thus, heat from radiator 18 that would normally have been "dumped" to the outside is now used to increase the efficiency of the supplementary heat pump system. Likewise, icing of the outside heat exchanger 24 is prevented or reduced, simply by blocking the direct outside cold air flow through it, but radiator 18 is still able to provide engine cooling by virtue of the reversed fan air flow through it. If icing should occur when panel 26 is in its normal position, then it can be moved to the blocking position, with fan 20 reversed, specifically to de ice. Such a method is far preferable to the known method of simply running the heat pump system back in its "summer" mode, which does warm and dec ice the outside heat exchanger 24, but which also cools the passenger compartment 22, an obvious detriment to cold weather comfort. The blocking position of panel 26 and reversal of fan 20 could be selected on demand, by a vehicle operator, or automatically, based on outside air temperature and other conditions.

Referring next to FIG. 3, the "normal" or first position of panel 26 leaves the outside heat exchanger 24 and radiator 18 open to the usual ram air flow, as shown, with fan 20 assisting by running in the normal direction, at lower vehicle speeds, or simply free wheeling at high vehicle speeds, so as to not interfere with the normal ram flow. Thus, in winter or summer, radiator 18 would be cooling the engine 12 with the usual rearward air flow. In summer, the outside heat exchanger 24 would also be operating conventionally, as a condenser, dumping heat to the rearward flowing ram air. In winter, outside heat exchanger 24 would be operating in reverse, extracting available heat from the air flow. And, if the outside air were too cold to operate efficiently, the FIG. 1 position could be reverted to.

Figure 2:
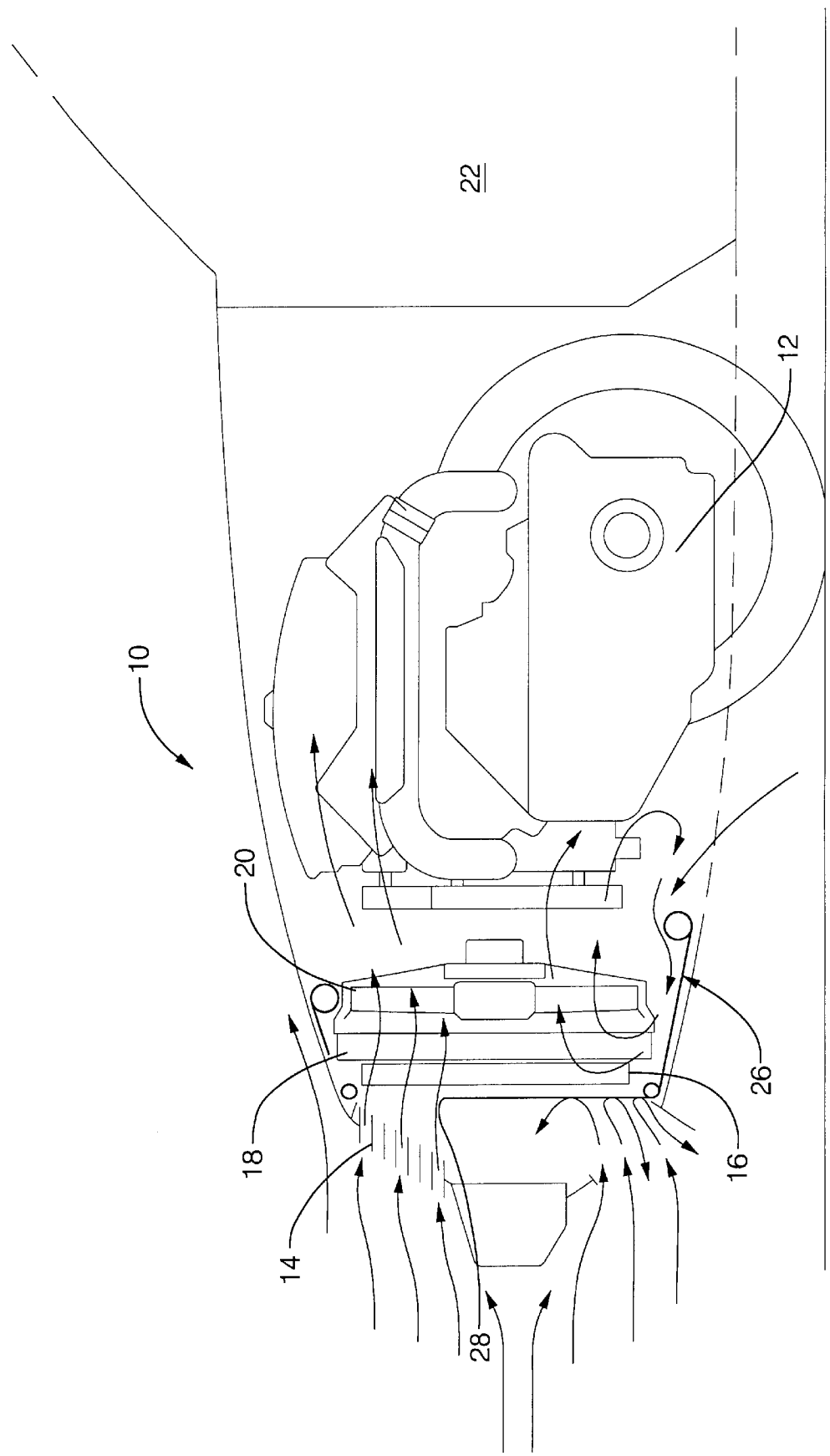
FIG. 2 shows the flexible panel in a mediate position, allowing some ram air flow through, but blocking the area below the heat exchangers and fan.

Referring next to FIG. 2, the ability to run panel 26 back and forth continuously, rather than just between full "on" and full "off" positions, provides another potential benefit. One problem with normal idle operation of the vehicle, when fan 20 is running in the normal direction, but the vehicle is stationary or nearly so, is that the heated air that has passed through the radiator 18 is not strongly shed. The heated air can be undesirably recirculated from beneath and back up again through the main air stream created by fan 20. In that situation, the panel 26 can be positioned as shown in FIG. 2, with the window 28 partially blocking the grill 14, and with the solid portion of panel 26 blocking the area beneath radiator 18 and front end heat exchanger 24. Enough outside air can be pulled in by fan 20 (running in the normal direction) to cool radiator 18, and the reduction of hot recirculated air improves the efficiency of both heat exchangers 18 and 24.

Variations in the disclosed embodiment could be made. Fundamentally, as a method, any selective front end air flow blocking device located in front of the heat exchanger 24 could be used, in conjunction with the reversible fan, to enhance the efficiency of the outside heat exchanger 24. The fan 20 could be located elsewhere, such as between the radiator 18 and heat exchanger 24, and still provide the desired air flow. Even if a front end heat exchanger 24 were not present, just the radiator 18, the flexible panel 24 could still be used to decrease the engine warm up delay. Therefore, it will be understood that it is not intended to limit the invention to just the embodiment disclosed.

What is claimed is:

1. For use in an automotive vehicle of the type having a vehicle body with a front end air opening through which outside air is rearwardly forced by the forward motion of said vehicle, a liquid coolant radiator mounted within said front end air opening that has heated liquid coolant pumped through it to release heat to the air flowing over it, a means for controlling the forced air flow through said radiator, comprising, a flexible film panel adapted to be rolled back and forth continuously over a generally vertical length arrayed in front of said radiator, substantially filling said front end air opening, and a generally horizontal length arrayed below said outside radiator and fan, said film panel having a window therein that can selectively be shifted from a normal, first position within said vertical length, so as to leave said front end opening substantially unblocked, or to a second, blocking position within said horizontal length, so as to substantially cover said front end opening, whereby, said panel can be shifted from the normal, first position, allowing forced rearward air flow through said radiator, toward the second position thereby selectively preventing forced rearward air flow through said radiator.

2. For use in an automotive vehicle of the type having a vehicle body with a front end air opening through which outside air is rearwardly forced by the forward motion of said vehicle, a liquid coolant radiator mounted within said front end air opening that has heated liquid coolant pumped through it to release heat to the air flowing over it, and a fan mounted proximate to said radiator to blow air rearwardly through it in addition to the forward motion of said vehicle, a means for controlling the forced air flow through said radiator, comprising, means for selectively reversing said fan, so as to reverse the direction of blown air flow therefrom, a flexible film panel adapted to be rolled back and forth continuously over a generally vertical length arrayed in front of said radiator, substantially filling said front end air opening, and a generally horizontal length arrayed below said outside radiator and fan, said film panel having a window therein that can selectively be shifted from a normal, first position within said vertical length, so as to leave said front end opening substantially unblocked, or to a second, blocking position within said horizontal length, so as to substantially cover said front end opening, whereby, said panel can be shifted from the normal, first position, allowing forced rearward air flow through said radiator, toward the second position, thereby selectively preventing forced rearward air flow, and said fan can be concurrently reversed so as to provide a reversed, independent outside air flow over said radiator while said vehicle is moving forwardly.

3. For use in an automotive vehicle of the type having a vehicle body with a front end air opening through which outside air is rearwardly forced by the forward motion of said vehicle, an air conditioning system outside heat exchanger mounted in said air opening that has pressurized refrigerant selectively pumped through to extract heat energy from the outside air flowing over it, a liquid coolant radiator mounted behind said outside heat exchanger that has heated liquid coolant pumped through it to release heat to the air flowing over it, and a fan mounted proximate to said radiator and outside heat exchanger to simultaneously blow air rearwardly through said outside heat exchanger and radiator in series in addition to the forward motion of said vehicle, a means for increasing the efficiency of said outside heat exchanger, comprising, means for selectively reversing said fan, so as to reverse the direction of blown air flow therefrom, a flexible film panel adapted to be rolled back and forth continuously over a generally vertical length arrayed in front of said outside heat exchanger, substantially filling said front end air opening, and a generally horizontal length arrayed below said outside heat exchanger, radiator and fan, said film panel having a window therein that can selectively be shifted from a normal, first position within said vertical length, so as to leave said front end opening substantially unblocked, or to a second, blocking position within said horizontal length, so as to substantially cover said front end opening, whereby, under conditions where said outside air has a low heat energy content, said panel can be shifted from the normal, first position to the second position, thereby substantially preventing forced rearward air flow, while said fan is concurrently reversed, so that outside air is blown in reverse, forwardly through said radiator and outside heat exchanger in series, thereby extracting heat from said radiator before flowing over said outside heat exchanger to increase the efficiency of its heat extraction.

4. In an automotive vehicle of the type having a vehicle body with a front end air opening through which outside air is rearwardly forced by the forward motion of said vehicle, an air conditioning system outside heat exchanger mounted in said air opening that has pressurized refrigerant selectively pumped through to extract heat energy from the outside air flowing over it, a liquid coolant radiator mounted behind said outside heat exchanger that has heated liquid coolant pumped through it to release heat to the air flowing over it, and a fan mounted proximate to said radiator and outside heat exchanger to simultaneously blow air rearwardly through said outside heat exchanger and radiator in series in addition to the forward motion of said vehicle, a method for increasing the efficiency of operation of said outside heat exchanger, comprising the steps of;

blocking the outside air flow through said front end air opening, and, concurrently reversing the direction of said fan so as to force air forwardly, through said radiator and then through said outside heat exchanger in series, thereby extracting heat from said radiator before flowing over said outside heat exchanger to increase the efficiency of its heat extraction.

* * * * *